(12) United States Patent
Eddington et al.

(10) Patent No.: US 12,553,419 B2
(45) Date of Patent: Feb. 17, 2026

(54) ACTUATOR ASSEMBLY

(71) Applicant: Cambridge Mechatronics Limited, Cambridge (GB)

(72) Inventors: Robin Eddington, Cambridge (GB); Robert Langhorne, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/860,722

(22) PCT Filed: Apr. 28, 2023

(86) PCT No.: PCT/GB2023/051142
§ 371 (c)(1),
(2) Date: Oct. 28, 2024

(87) PCT Pub. No.: WO2023/209395
PCT Pub. Date: Nov. 2, 2023

(65) Prior Publication Data
US 2025/0369428 A1 Dec. 4, 2025

(30) Foreign Application Priority Data

Apr. 28, 2022 (GB) .................................. 2206251
Apr. 28, 2022 (GB) .................................. 2206253
(Continued)

(51) Int. Cl.
G03B 19/04 (2021.01)
F03G 7/06 (2006.01)
(52) U.S. Cl.
CPC ...... F03G 7/06143 (2021.08); F05B 2260/50 (2013.01); F05B 2270/804 (2013.01)

(58) Field of Classification Search
CPC ........ G03B 19/04; G03B 17/02; G03B 17/14; G03B 2219/04; G03B 2217/002
See application file for complete search history.

(56) References Cited

U.S. PATENT DOCUMENTS

2018/0171991 A1* 6/2018 Miller .................... G02B 7/023

FOREIGN PATENT DOCUMENTS

CN 111552092 A 8/2020
WO 2018112436 A1 6/2018
(Continued)

OTHER PUBLICATIONS

International Search Report and Written Opinion for Application No. PCT/GB2023/051142 dated Jul. 9, 2023 (59 pages).
(Continued)

Primary Examiner — Shafiq Mian
(74) Attorney, Agent, or Firm — Van Hoven PC; Stefan D. Osterbur; Joshua Van Hoven

(57) ABSTRACT

An actuator assembly comprising: a first part; a second part that is movable relative to the first part; and one or more actuating units each configured to apply an actuating force to the second part capable of moving the second part relative to the first part, wherein each actuating unit comprises: a body portion; a bearing arrangement between the body portion and the first or second part and arranged to guide movement of the body portion relative to the first or second part in an actuating plane; an SMA element connected between the body portion and the first part, and arranged, on actuation, to apply an input force to the body portion; and a force-modifying element connected between the body portion and the first part and configured to modify the input force so as to give rise to the actuating force.

20 Claims, 9 Drawing Sheets

(30) Foreign Application Priority Data

Jul. 22, 2022 (GB) ...................................... 2210793
Jul. 22, 2022 (GB) ...................................... 2210798

(56) References Cited

FOREIGN PATENT DOCUMENTS

| WO | 2022084699 A1 | 4/2022 |
|----|---------------|--------|
| WO | 2022118048 A1 | 6/2022 |

OTHER PUBLICATIONS

Search Report for Application No. GB2210793.2 dated Jul. 31, 2023 (5 pages).
Search Report for Application No. GB2210798.1 dated Aug. 14, 2023 (5 pages).

* cited by examiner

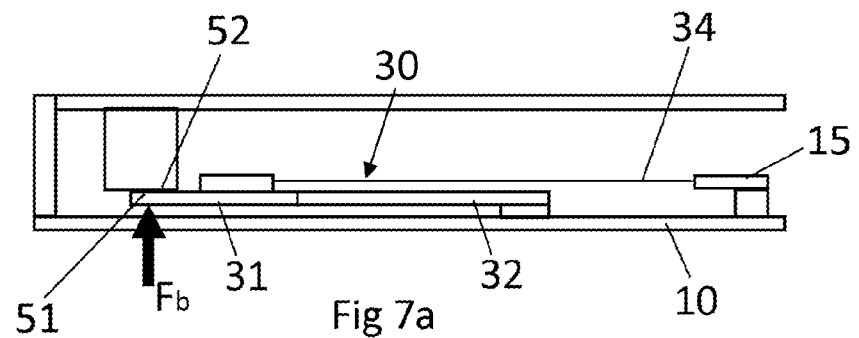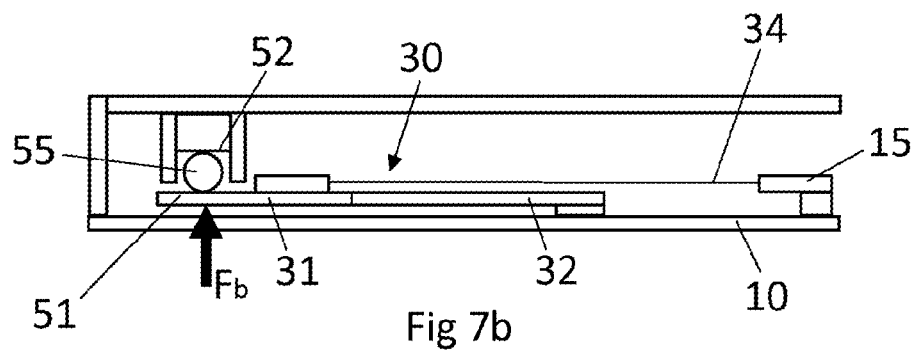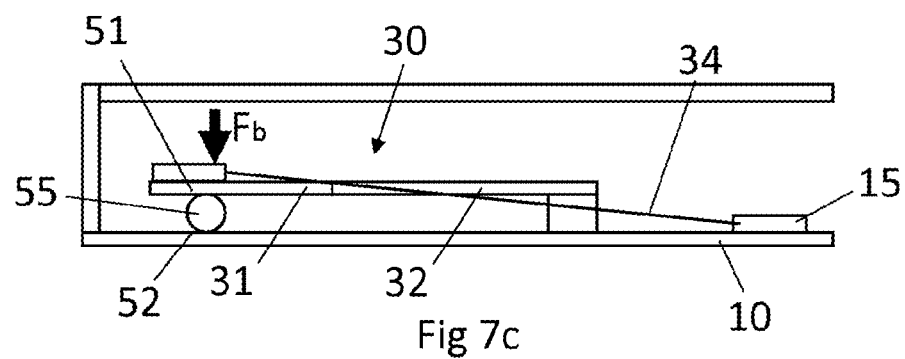

ACTUATOR ASSEMBLY

CROSS-REFERENCE TO RELATED APPLICATIONS

The present application is a national stage application under 35 U.S.C. 371 of International Application No. PCT/GB2023/051142, filed Apr. 28, 2023, and entitled "ACTUATOR ASSEMBLY," which claims priority to GB Patent Application No. 2206251.7, entitled "Actuator assembly" and filed on Apr. 28, 2022; GB Patent Application No. 2206253.3, entitled "Actuator assembly" and filed on Apr. 28, 2022; GB Patent Application No. 2210793.2, entitled "Actuator assembly" and filed on Jul. 22, 2022; and GB Patent Application No. 2210798.1, entitled "Actuator assembly" and filed on Jul. 22, 2022, and the contents of each are hereby expressly incorporated by reference herein in their entireties for all purposes.

FIELD

The present application relates to an actuator assembly with one or more actuating units, each of which includes a shape memory alloy (SMA) element.

BACKGROUND

SMA actuator assemblies may be used in a variety of applications for moving a movable part relative to a support structure.

For example, WO 2013/175197 A1 describes a camera in which four SMA wires are arranged to move a lens element relative to an image sensor in a plane that is perpendicular to the optical axis of the lens element, thereby effecting optical image stabilization (OIS). WO 2010/029316 A1 describes SMA actuator wires used to provide OIS in a camera by tilting a camera module. WO 2011/104518 A1 describes an actuator assembly having eight SMA wires capable of effecting positional control of a movable element with multiple degrees of freedom.

Typically, the range of movement (also known as "stroke") of such SMA actuator assemblies is limited by the maximum contraction of the SMA wires, and the actuating force is limited by the maximum force that can generated by the SMA wires. To increase the movement range or the actuating force, longer or thicker SMA actuator wires can be used, but this may be at the expense of increased cost, size and/or power, which may not be practical in miniature applications.

WO 2022/084699 A1 discloses an actuator assembly comprising at least one actuating unit (incorporating an SMA wire) that, on actuation, moves a movable part relative to the support structure. The actuating unit may be configured to amplify the movement range of the movable part, to amplify the actuating force acting on the movable part, or to re-direct the force applied by the SMA wire.

SUMMARY

According to an aspect of the present invention, there is provided an actuator assembly comprising: a first part; a second part that is movable relative to the first part; and one or more actuating units each configured to apply an actuating force to the second part capable of moving the second part relative to the first part, wherein each actuating unit comprises: a body portion; a bearing arrangement between the body portion and the first or second part and arranged to guide movement of the body portion relative to the first or second part in an actuating plane; an SMA element connected between the body portion and the first part, and arranged, on actuation, to apply an input force to the body portion; and a force-modifying element connected between the body portion and the first part and configured to modify the input force so as to give rise to the actuating force.

In some embodiments, the bearing arrangement comprises a rolling bearing, the rolling bearing comprising a first bearing surface on the body portion, a second bearing surface on the first or second part, and a rolling element arranged between the first and second bearing surfaces, wherein the rolling element is arranged to roll relative to the first and second bearing surfaces on actuation of the actuating unit.

In some embodiments, the bearing arrangement comprises a plain bearing, the plain bearing comprising a first bearing surface on the body portion and a second bearing surface on the first or second part, wherein the first and second bearing surfaces are arranged to bear against each other on actuation of the actuating unit.

In some embodiments, the force-modifying element and/or the coupling link is configured to load the bearing arrangement.

In some embodiments, the SMA element is arranged, on actuation, to load the bearing arrangement.

In some embodiments, each actuating unit comprises a first friction surface biased to engage a corresponding second friction surface on the first or second part so as to generate a static frictional force that constrains movement of the body portion of the actuating unit relative to the second friction surface when the SMA element is not actuated.

In some embodiments, the first and second friction surfaces form part of the bearing arrangement.

In some embodiments, the first and second friction surfaces are separate to the bearing arrangement.

In some embodiments, the force-modifying element and/or the coupling element is arranged to bias the first and second friction surfaces against each other.

In some embodiments, the SMA element is arranged, on actuation, to reduce the frictional force between the first and second friction surfaces.

In some embodiments, the SMA element is arranged, on actuation, to disengage the first and second friction surfaces.

In some embodiments, the SMA element is arranged, on initial actuation, to move the body portion in a direction orthogonal to the actuating plane so as to engage the bearing arrangement and is arranged, on further actuation, to apply an input force to the body portion capable of moving the body portion in the actuating plane.

In some embodiments, the force-modifying element comprises a force-modifying flexure.

In some embodiments, the force-modifying element is arranged to be in tension on actuation of the SMA element.

In some embodiments, the force-modifying element is arranged at an angle relative to the SMA wire, preferably at an angle in the range from 13 to 77 degrees, optionally from 13 to 40 degrees or from 77 to 50 degrees.

In some embodiments, each actuating unit is configured so as to amplify an amount of actuation of the SMA element to a relatively greater amount of movement of the second part relative to the first part, optionally by a factor greater than 1.5, preferably greater than 2, further preferably greater than 3.

In some embodiments, each actuating unit is configured so as to amplify the input force such that the actuation force is greater than the input force, optionally by a factor greater than 1.5, preferably greater than 2, further preferably greater than 3.

In some embodiments, each actuating unit further comprises a coupling link connected between the body portion and the second part, wherein the coupling link is configured to transmit the actuating force from the body portion to the second part, and wherein the coupling link is compliant in a direction perpendicular to the direction of the actuating force.

In some embodiments, the coupling link comprises a coupling flexure.

In some embodiments, the coupling link is arranged to be in tension on actuation of the SMA element.

In some embodiments, the angle between the coupling link and the SMA wire is in the range from 70 to 110 degrees.

In some embodiments, each actuating unit extends substantially in the actuating plane.

In some embodiments, the body portion and the force-modifying flexure are integrally formed from the same material, optionally wherein the coupling link is further formed from the same material.

Some embodiments comprise a total of four actuating units arranged to apply actuating forces such that none of the actuating forces are non-collinear.

In some embodiments, the four actuating units are arranged such that a first pair of actuating units applies actuating forces in opposite directions parallel to a first axis in a plane and a second pair of actuating units applies actuating forces in opposite directions parallel to a second axis in the plane, wherein the first and second axes are non-parallel.

In some embodiments, the first pair of actuating units is arranged to apply a torque to the second part relative to the first part in a first sense, and the second pair of actuating units is arranged to apply a torque to the second part relative to the first part in a second sense, wherein the second sense is opposite to the first sense.

Some embodiments comprise an image sensor and/or a lens assembly, wherein the image sensor or the lens assembly is fixed relative to the second part and/or the lens assembly or the image sensor is fixed relative to the first part.

According to another aspect of the present invention, there is provided an actuator assembly comprising: a first part; a second part that is movable relative to the first part; and one or more actuating units each configured to apply an actuating force to the second part capable of moving the second part relative to the first part, wherein each actuating unit comprises: a body portion; an SMA element connected between the body portion and the first part, and arranged, on actuation, to apply an input force to the body portion; and a force-modifying element connected between the body portion and the first part and configured to modify the input force so as to give rise to the actuating force, wherein the actuating unit comprises a first friction surface biased to engage a corresponding second friction surface on the first or second part so as to generate a static frictional force that constrains movement of the body portion of the actuating unit relative to the second friction surface when the SMA element is not actuated.

In some embodiments, each actuating unit further comprises a bearing arrangement between the body portion and the first or second part and arranged to guide movement of the body portion relative to the first or second part in an actuating plane.

In some embodiments, the first and second friction surfaces form part of the bearing arrangement.

In some embodiments, the first and second friction surfaces are separate to the bearing arrangement.

In some embodiments, the force-modifying element and/or the coupling element is arranged to bias the first and second friction surfaces against each other.

In some embodiments, the SMA element is arranged, on actuation, to reduce the frictional force between the first and second friction surfaces.

In some embodiments, the SMA element is arranged, on actuation, to disengage the first and second friction surfaces.

In some embodiments, the SMA element is arranged, on initial actuation, to move the body portion in a direction orthogonal to the actuating plane so as to engage the bearing arrangement and is arranged, on further actuation, to apply an input force to the body portion capable of moving the body portion in the actuating plane.

According to another aspect of the present invention, there is provided an actuator assembly comprising: first and second parts that are movable relative to each other; one or more actuating units, each actuating unit comprising: a force-modifying mechanism connected to the first part; a coupling link connected between the force-modifying mechanism and the second part; and an SMA wire connected between the first part and the force-modifying mechanism for applying an input force on the force-modifying mechanism thereby causing the force-modifying mechanism to apply an output force on the coupling link and causing the coupling link to apply an actuating force on the second part; wherein the coupling link is compliant in a direction perpendicular to the direction of the actuating force; and one or more bearings for each of the one or more actuating units, each bearing located between the actuating unit and the first part or the second part.

In some embodiments, the first and second parts are movable relative to each other in a movement plane perpendicular to a primary axis.

In some embodiments, the bearing is in contact with a part of the actuating unit which is wider than the coupling link in the movement plane, optionally wherein the body portion is wider than the coupling link in the movement plane and the bearing is in contact with the body portion of the actuating unit.

Some embodiments comprise two bearings, one located between one of the one or more actuating units and the first part and the other located between the actuating unit and the second part.

In some embodiments, the bearing is located between the actuating unit and one of the first part and the second part, and the actuating unit is preloaded towards said one of the first part and the second part.

In some embodiments, part of the actuating unit extends at an oblique angle to the movement plane so as to, under tension, bias the actuating unit onto the bearing.

In some embodiments, said part is the SMA wire, the coupling link or a force-modifying flexure of the force-modifying mechanism.

In some embodiments, the second part comprises an image sensor, the image sensor having an imaging axis perpendicular to the movement plane, wherein the actuator assembly provides optical image stabilisation (OIS) for the camera assembly.

In some embodiments, the image sensor is located between the element of an imaging system comprised in the first part and at least part of the one or more actuating units.

BRIEF DESCRIPTION OF THE DRAWINGS

Certain embodiments of the present invention will now be described, by way of example only, with reference to the accompanying drawings, in which:

FIGS. 7a-c are schematic side views of actuator assemblies comprising actuating units with a bearing arrangement;

DETAILED DESCRIPTION

Camera Module

FIGS. 1A-E schematically shows different variations of an apparatus 1 incorporating an actuator assembly 2. The apparatus 1 is, for example, a camera module 1. Generally, the apparatus 1 is to be incorporated in a portable electronic device such as a smartphone. Thus, miniaturisation can be an important design criterion.

Figure 2:
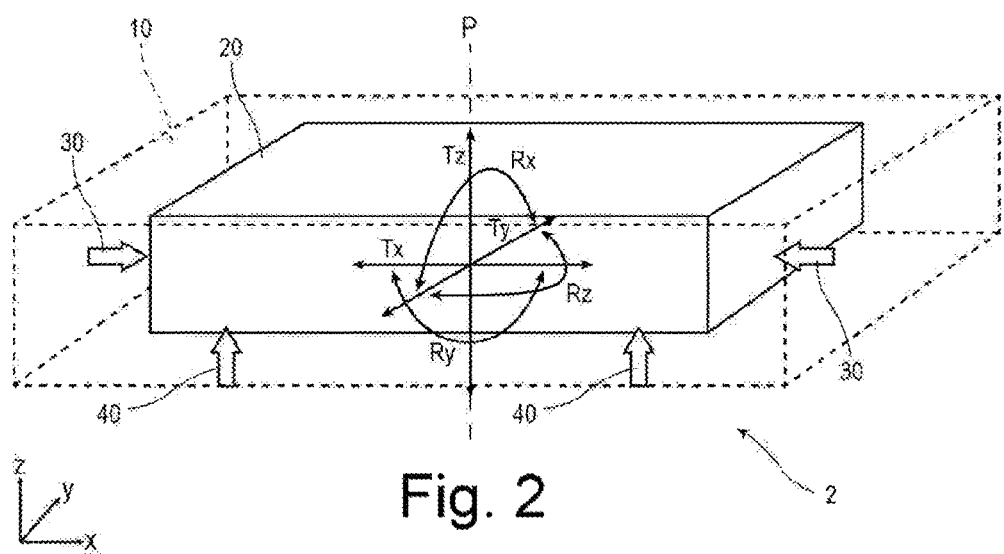
FIG. 2 is a schematic perspective view of the actuator assembly.

FIG. 2 schematically shows the actuator assembly 2. The actuator assembly 2 includes a support structure 10 and a movable part 20. The movable part 20 is movable relative to the support structure 10. When the actuator assembly 2 is included e.g. in the apparatus 1, the support structure 10 may be fixed relative to the main body of the apparatus 1. However, in general, the support structure 10 need not be stationary and may be movable relative to or within the apparatus 1. The actuator assembly 2 includes one or more actuating units 30. Each actuating unit 30 is configured to apply an actuating force to the movable part 20 capable of moving the movable part 20 relative to the support structure 10.

The movable part 20 may be supported (i.e. suspended) on the support structure 10 exclusively by the actuating units 30. Alternatively, the actuator assembly 2 may include a bearing arrangement 40 that supports the movable part 20 on the support structure 10. The actuating units 30 and the bearing arrangement 40 may together support the movable part 20 on the support structure 10. The bearing arrangement 40 may have any suitable form for allowing movement of the movable part 20 with respect to the support structure 10 with one or more degrees of freedom (DOFs). The actuating units 30 and/or the bearing arrangement 40 may constrain, i.e. reduce or prevent, other DOFs of movement of the movable part 20 relative to the support structure 10. For this purpose, the bearing arrangement 40 may, for example, include one or more of the following bearings: a rolling bearing (such as a ball bearing), a flexure bearing (i.e. an arrangement of flexures or other resilient elements that guide movement), or a plain (i.e. sliding contact) bearing.

A primary axis P can be defined with reference to the actuator assembly 2 and/or the support structure 10. The primary axis P may extend through the actuator assembly 2, e.g. through the centre of the actuator assembly 2. In some examples, the actuator assembly 2, the support structure 10 and/or the movable part 20 extends predominantly in a direction perpendicular to the primary axis P. In other words, the extent of the actuator assembly 2, the support structure 10 and/or the movable part 20 along the primary axis P is less than the extent thereof along any direction perpendicular to the primary axis P. Alternatively or additionally, the support structure 10 and/or movable part 20 may include a planar component that extends perpendicularly to the primary axis P. Alternatively or additionally, in examples in which the apparatus 1 includes an optical element (such as a lens assembly 3) with an optical axis, or an imaging element (such as an imager sensor 4) with an imaging axis, the primary axis P may be parallel to such an axis and/or may coincide with such an axis when the movable part 20 is in a central position or orientation (for example, see FIG. 3A).

In general, the movable part 20 may be movable relative to the support structure 10 with up to six degrees of freedom (DOFs). In the context of describing the DOFs of movement, the primary axis P may also be referred to as the z axis, and two further axes that are perpendicular to the primary axis P and to each other may be referred to as the x and y axes. The movable part 20 may be movable relative to the support structure 10 in all or in any subset (including only one) of the following DOFs:

Tx and Ty: Translational movement in the x-y plane. In other words, the movable part 20 may be independently movable along the x and y axes. The movable part 20 may be movable to any position in the x-y plane within a range of movement. Instead of such planar movement, the movable part 20 may be movable linearly, e.g. along the x or y axis.

Rx and Ry: Rotational movement (or simply rotation or tilting) about the x and y axes. In other words, the movable part 20 may be rotated about any line perpendicular to the primary axis P. The movable part 20 may be rotatable to any rotational position (i.e. to any orientation) within a range of movement. Instead of such two-axis rotation, the movable part 20 may be rotatable about a single axis, e.g. about the x or y axis.

Tz: Translational movement along the z axis. The movable part 20 may be movable to any translational position along the z axis within a range of movement.

Rz: Rotational movement (or simply rotation) about the z axis. The movable part 20 may be rotatable to any rotational position (i.e. to any orientation) within a range of movement.

In some examples, the movable part 20 may be supported, e.g. by the bearing arrangement 40, so as to allow translational movement in the x-y plane (Tx, Ty) and/or rotational movement about the z axis (Rz). Translational movement along the z axis (Tz) and rotational movement about the x and y axes (Rx, Ry) may be constrained. Such support may be provided, for example, with a bearing arrangement 40 with a suitable arrangement of ball bearings or plain bearings which produce bearing forces in the +z direction and a biasing arrangement which produces a biasing force in the −z direction. Examples of actuator assemblies with such a bearing arrangement are disclosed in WO 2013/175197 A1 and WO 2017/072525 A1, each of which is herein incorporated by reference.

In some examples, the movable part 20 may be supported so as to allow tilting about the x and y axes (Rx, Ry) and optionally rotation about the z axis (Rz). The other DOFs of movement (i.e. Tx, Ty, Tz, Rz, or Tx, Ty, Tz) may be constrained. Such support may be provided by the bearing arrangement 40, for example in the form of a gimbal. Examples of such a bearing arrangement 40 are disclosed in WO 2021/209770 A1, which is herein incorporated by reference. Alternatively, such support may be provided exclusively by the actuating units 30, similarly to WO 2011/104518 A1 which discloses an actuator assembly with 8 SMA wires connected between the support structure 10 and the movable part 20. WO 2011/104518 A1 is herein incorporated by reference.

In some examples, the movable part 20 may be supported so as to allow three-dimensional translational movement (Tx, Ty, Tz), while rotational movement (Rx, Ry, Rz) may be constrained. Such support may be provided by the bearing arrangement 40, for example in the form of nested linear bearings. Examples of such a bearing arrangement 40 are disclosed in WO 2021/209769 A1, which is herein incorporated by reference. Alternatively, such support may be provided exclusively by the actuating units 30, similarly to WO 2011/104518 A1.

The movable part 20 may, alternatively or additionally, move in other DOFs. The movable part 20 may move in DOFs that are a combination of any two or more of Tx, Ty, Tx, Rx, Ry and Rz. For example, the movable part 20 may move along a helical path (i.e. move helically) about the z axis, and so concurrently move along the z axis and rotate about the z axis. In other words, Tz and Rz movement may be coupled. An example of such a helical actuator assembly is disclosed in WO 2019/243849 A1, which is herein incorporated by reference.

The actuating units 30 are connected between the support structure 10 and the movable part 20. The actuating units 30 are arranged to apply actuating forces F (see e.g. FIGS. 4 and 5) between the movable part 20 and the support structure 10. Selectively varying the actuating forces F may cause the movable part 20 to move relative to the support structure 10, for example within the DOFs allowed by the bearing arrangement 40. The actuating units 30 are thus capable of driving movement of the movable part 20 relative to the support structure 10.

The bearing arrangement 40 may cause the movable part 20 to move in directions which differ from the directions of the actuating forces F. In simple examples of this, one component of each actuating force F causes the movement of the movable part 20, and another component of each actuating force F acts against the forces produced by the bearing arrangement 40.

The camera module 1 also includes a lens assembly 3 and an image sensor 4. The lens assembly 3 includes one or more lenses configured to focus an image on the image sensor 4. The lens assembly 3 defines an optical axis O. The lens assembly 3 may include a lens carrier, for example in the form of a cylindrical body, supporting the one or more lenses. The image sensor 4 captures an image and may be of any suitable type, for example a charge coupled device (CCD) or a complementary metal-oxide-semiconductor (CMOS) device. The camera module 1 may be a compact camera module in which each lens has a diameter of 20 mm or less, for example of 12 mm or less.

Figure 1:
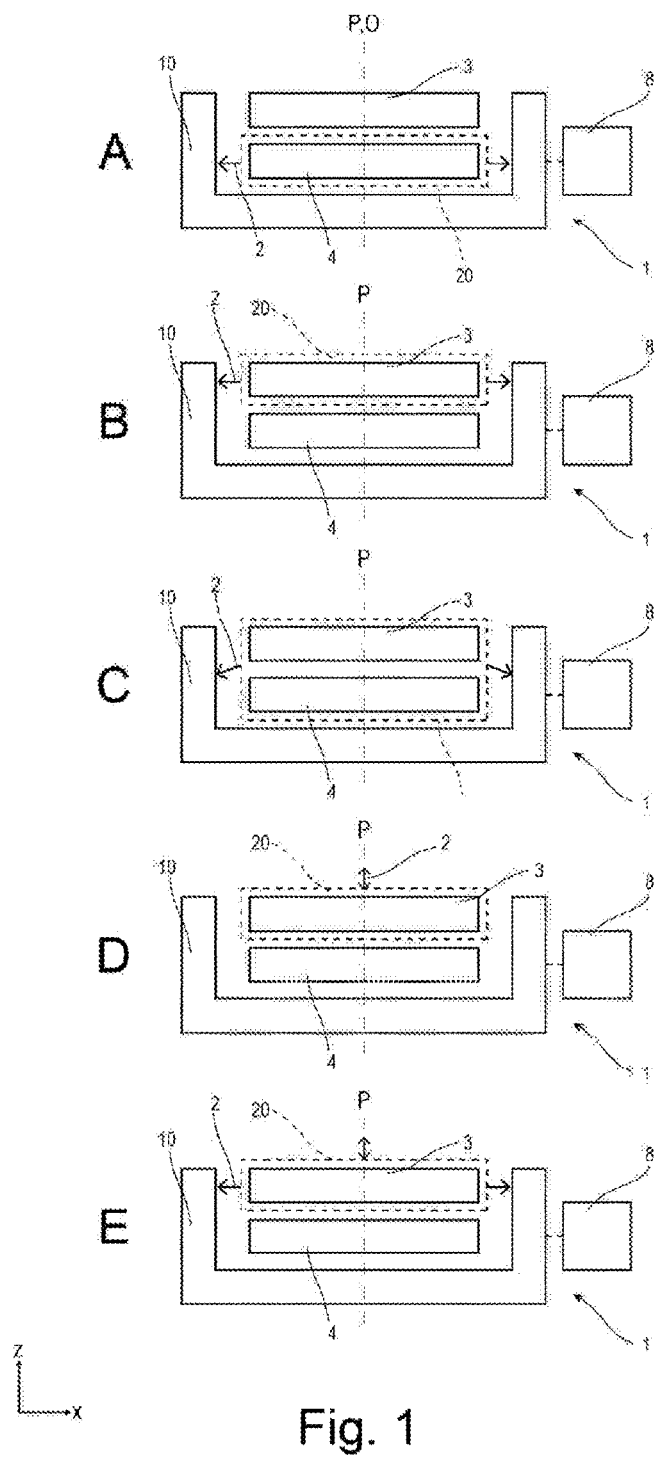
FIGS. 1A-E are schematic cross-sectional views of different variations of a camera module incorporating an actuator assembly.

In the ("sensor-shift") variation of the camera module 1 shown in FIG. 1A, the movable part 20 includes the image sensor 4. The lens assembly 3 may be fixed relative to the support structure 10, or may be movable relative to the support structure 10 along the optical axis O, as described below.

In the ("lens-shift") variation, the image sensor 4 is fixed relative to the support structure 10 and the movable part 20 includes the lens assembly 3. The lens assembly 3 may be movable relative to the movable part 20 along the optical axis O, as described below.

In both of these variations, the actuator assembly 2 is configured to move the lens assembly 3 relative to the image sensor 4 in any direction in the plane perpendicular to the primary axis P and hence the optical axis O. Such movement has the effect of moving the image on the image sensor 4 and enables optical image stabilisation (OIS) to be implemented in the camera module 1. In the sensor-shift variation, the movable part 20 may also be rotatable about the primary axis P so as to also enable compensation for roll.

In the ("module-tilt") variation shown in FIG. 1C, the movable part 20 includes both the lens assembly 3 and the image sensor 4. Again, the lens assembly 3 may be movable relative to the movable part 20 along the optical axis O, as described below. The actuator assembly 2 is configured to tilt the movable part 20 about two axes perpendicular to the primary axis P and to each other, and optionally rotate the movable part 20 about the primary axis P, enabling OIS to be implemented in the camera module 1.

In the ("autofocus") variation shown in FIG. 1D, the movable part 20 includes the lens assembly 3, and the actuator assembly 2 moves the movable part 20 relative to the support structure 10 along the primary axis P and hence the optical axis O. Such movement has the effect of adjusting the focus of the image on the image sensor 4. So, auto-focus (AF) or zoom functionality can be implemented in the camera module 1.

In some examples (not shown), the camera module 1 may include a first actuator assembly for providing OIS as illustrated in FIGS. 1A-C, and a second actuator assembly for providing AF as illustrated in FIG. 1D. One or both of the first and second actuator assemblies may correspond to actuator assemblies 2 as described herein. One of the first and second actuator assemblies may be another type of SMA actuator assembly or may be a non-SMA actuator assembly, e.g. a voice-coil motor (VCM) actuator assembly. As will be appreciated, in the lens-shift and module-tilt variations, the support structure 10 of the second actuator assembly 2 is fixed (or corresponds) to the movable part 20 of the first actuator assembly 2.

In the ("AF+OIS") variation shown in FIG. 1E, the movable part 20 includes the lens assembly 3 and the actuator assembly 2 produces three-dimensional translational movement of the movable part 20 relative to the support structure 10, enabling both AF and OIS to be implemented using one actuator assembly 2.

Other variations are also possible. For example, in the autofocus variation or the AF+OIS variation, the movable part 20 may include the image sensor 4 rather than the lens assembly 3. The camera module 1 may include combinations of the above described features, e.g. (a) lens shift and sensor shift, (b) module tilt and lens shift or sensor shift and autofocus, or (c) module tilt and AF+OIS.

The camera module 1 also includes a controller 8. The controller 8 may be implemented in an integrated circuit (IC) chip. The controller 8 generates drive signals for the actuating units 30, in particular for SMA wires 34 forming part of the actuating units 30. SMA material has the property that on heating it undergoes a solid-state phase change that causes the SMA material to contract. Thus, applying drive signals to the SMA wires 34, thereby heating the SMA wires 34 by allowing an electric current to flow, will cause the SMA wires 34 to contract and thus actuate the actuating unit 30 so as to move the movable part 20. The drive signals are chosen to drive movement of the movable part 20 in a desired manner, for example so as to achieve OIS by stabilizing the image sensed by the image sensor 4 or to achieve AF/zoom by adjusting the focus of the image sensed by the image sensor 4. The controller 8 supplies the generated drive signals to the SMA wires 34.

Optionally, the camera module 1 also includes a motion sensor (not shown), which may include a 3-axis gyroscope and a 3-axis accelerometer. The motion sensor can generate signals representative of the motion (specifically vibrations or "shake") of the camera module 1, which can be processed so as to produce signals representative of the required movement of the movable part 20 to compensate for such shake. The controller 8 receives such signals and can generate the drive signals for the SMA wires 34 to achieve OIS.

Although the actuator assembly 2 is described in connection with a camera module 1, it will be appreciated that the actuator assembly 2 may be used in any device in which movement of a movable part 20 relative to a support structure 10 is desired, e.g. to provide haptic feedback in a haptic feedback device or to move a projector or display in an augmented reality (AR) or virtual reality (VR) device.

Actuating Unit

Figure 3A:
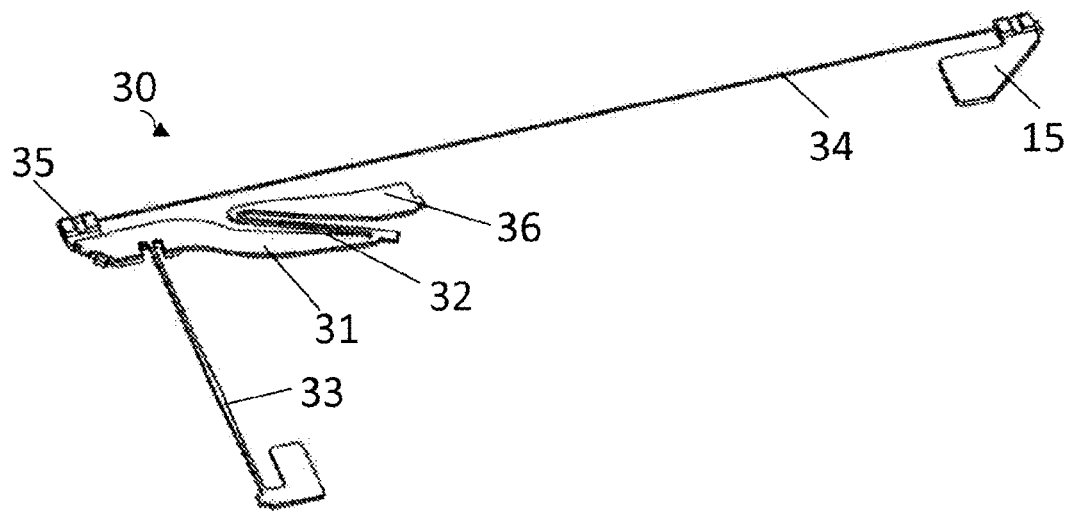
FIGS. 3A-C are perspective and plan views of an actuating unit forming part of the actuator assembly.
Figure 3B:
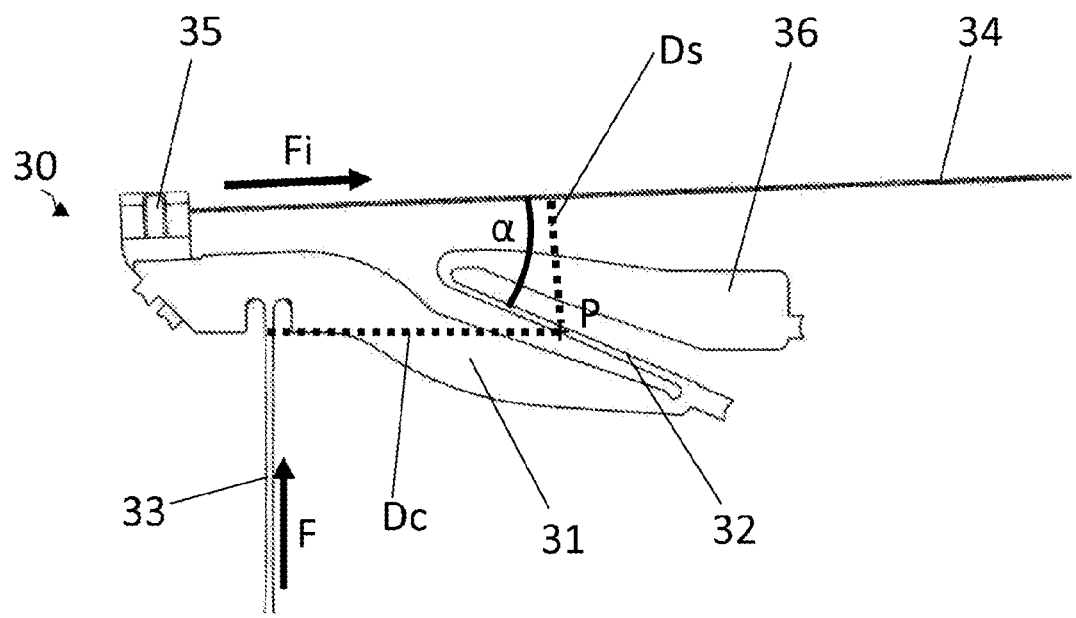

FIG. 3A shows a perspective view of an example of the actuating unit 30. FIG. 3B shows part of the actuating unit 30 in plan view.

A single actuating unit 30 is shown in FIGS. 3A and 3B, but it will be appreciated that the actuator assembly 2 generally has multiple actuating units 30, each of which may include the same components described with reference to FIGS. 3A and 3B.

The actuating unit 30 includes a body portion 31 to which several other components of the actuating unit 30 are connected as described below. Typically, the body portion 31 is relatively rigid compared to the other components of the actuating unit, and does not deform significantly on actuation of the actuating unit 30. In some examples, the body portion 31 is not a distinct part of the actuating unit 30. For example, the body portion 31 may be defined as part of one of the other components of the actuating unit 30 or simply as a connection point between other components of the actuating unit 30.

The actuating unit 30 also includes a force-modifying flexure 32. The force-modifying flexure 32 is connected between the body portion 31 and the support structure 10. One end of the force-modifying flexure 32 is connected to the body portion 31. The other end of the force-modifying flexure 32 is connected to the support structure 10, e.g. via a foot portion 36. The foot portion 36 is fixed relative to the support structure 10. In the depicted design, the force-modifying flexure is formed integrally with the foot portion 36 and with the body portion 31, for example from a single sheet of material (such as metal). The force-modifying flexure 32 allows the body portion 31 to pivot relative to the support structure 10 about an effective pivot point P. Although the effective pivot point P is shown in FIG. 3B as being positioned in the middle of force-modifying flexure 32, the effective pivot point P may have a different position and also need not lie on the force-modifying flexure 32. Such pivotal movement of the body portion 31 relative to the support structure 10 is initially in a direction that is substantially perpendicular to the force-modifying flexure 32.

The actuating unit 30 also includes an SMA element 34. In this example, the SMA element 34 is an SMA wire 34. The SMA wire 34 is connected between the body portion 31 and the support structure 10. One end of the SMA wire 34 is connected to the support structure 10, e.g. by a crimp 15. The other end of the SMA wire 34 is connected to the body portion 31, e.g. by a crimp 35.

The actuating unit 30 also includes a coupling link 33. In this example, the coupling link 33 is a coupling flexure 33. The coupling flexure 33 is connected between the body portion 31 and the movable part 20. One end of the coupling flexure 33 is connected to the body portion 31. The other end of the coupling flexure 33 is connected to the movable part 20. The coupling link 33 transfers or transmits an actuating force F from the body portion 31 to the movable part 20. The coupling link 33 is compliant (i.e. deformable) in a direction (or in multiple directions) perpendicular to the actuating force F. This allows the movable part 20 to move in directions other than the direction of the coupling flexure 33 and actuating force F. This can be needed, for example, where different actuating units 30 cause the movable part 20 to move in different directions.

The SMA wire 34 is arranged, on contraction, to apply an input force Fi on the body portion 31. The input force Fi acts parallel to the length of the SMA wire 34. The force-modifying flexure 32 and the body portion 31 are arranged to modify the input force Fi so as to give rise to the actuating force F, which is transmitted from the body portion 31 to the movable part 20 by the coupling flexure 33. In particular, the input force Fi deforms the force-modifying flexure 32, thereby causing the body portion 31 to pivot about the effective pivot point P. In simple terms, the force-modifying flexure 32 and the body portion 31 act like a lever. The force-modifying flexure 32 and the body portion 31 may modify the direction and/or the magnitude of the input force Fi so as to give rise to the actuating force F.

In the example illustrated in FIGS. 3A and 3B, the coupling flexure 33 is at an angle of ~90° relative to the SMA wire 34. Also, in this example, the force-modifying flexure 32 is arranged at an angle α of ~30° relative to the SMA wire 34, and the force-modifying flexure 32 is placed in tension on contraction of the SMA wire 34. Hence, on contraction of the SMA wire 34 and on resulting deformation of the force-modifying flexure 32, the body portion 31 initially moves at an angle of ~60° (90°−α) relative to the length of the SMA wire 34. Thus, it will be appreciated that, in this example, the force is de-amplified and the stroke is amplified, while the direction of the forces/movements is changed by an angle of ~90°.

More generally, the change in direction of the force depends on the angle between the SMA wire 34 and the coupling flexure 33. Also more generally, the change in magnitude of the force is dependent on the ratio of i) the distance Ds from the effective pivot point P to the line on which the SMA wire 34 lies and ii) the distance Dc from the effective pivot point P to the line on which the coupling flexure 33 lies. In particular, F/Fi is proportional to Ds/Dc. If the SMA wire 34 lies on a line that is closer to the effective pivot point P than the line on which the coupling flexure 33 lies, then the input force Fi is de-amplified. At the same time, the movement of the movable part 20 is amplified, i.e. increased relative to a change in length of the SMA wire 34. Alternatively, if the SMA wire 34 lies on a line that is further away from the effective pivot point P than the line on which the coupling flexure 33 lies, then the input force Fi is amplified. At the same time, the movement of the movable part 20 is de-amplified, i.e. decreased relative to a change in length of the SMA wire 34. The actuating unit 30 can thus be configured to amplify movement or to amplify force due to contraction of the SMA wire 34. The actuating unit 30 can also be configured to change the direction of the input force Fi. In some examples, the actuating unit 30 is configured to change the direction of the input force Fi without changing the magnitude of the force or movement.

The ratio Ds/Dc is dependent on the location of the end of the SMA wire 34 that is connected to the body portion 31 and the location of the end of the coupling flexure 33 that is connected to the body portion 31. By way of example, the distance Ds could be increased by connecting the coupling flexure further to the left of body portion 31 shown in FIG. 3B, thereby decreasing Ds/Dc and so increasing the amount of stroke amplification. The ratio Ds/Dc is also dependent on the orientation of the SMA wire 34 and the orientation of the coupling flexure 33. Such orientations can be defined with reference to the force-modifying flexure 32 (as above) or any suitable reference line. By way of example, the distance Ds could be decreased by angling the SMA wire 34 shown in FIG. 3B so that it passes closer to the effective pivot point P, thereby decreasing Ds/Dc and so increasing the amount of stroke amplification. In summary, the amount by which the force-modifying flexure 32 amplifies or de-amplifies the force/stroke of the SMA wire 34 may be tailored by:
- adjusting the angle of SMA wire 34 (and thus the input force Fi);
- adjusting the location of the connection point between the SMA wire 34 and the body portion 31 (and thus the location at which the input force Fi acts on the body portion 31);
- adjusting the angle of the coupling flexure 33 (and thus the actuating force F); and/or
- adjusting the location of the connection point between the coupling flexure 33 and the body portion 31 (and thus the location from which the body portion 31 applies the actuating force F).

In some examples, at least one actuating unit 30 (preferably each actuating unit 30) is configured such that the force-modifying flexure 32 amplifies an amount of contraction of the SMA wire 34. Such amplification, for example, may be by a factor greater than 1.5, preferably greater than 2, further preferably greater than 3. For this purpose, in the example illustrated in FIGS. 3A and 3B, the angle α between the SMA wire 34 and the force-modifying flexure 32 may be in the range from 0 to 45 degrees, preferably from 13 to 40 degrees. However, in general, the angle α may have other values and the connection points of the SMA wire 34 and/or coupling flexure 33 to the body portion 31 may be adjusted to achieve a desired amount of amplification.

As described above, in the example illustrated in FIGS. 3A and 3B, the coupling flexure 33 is at an angle of about 90 degrees relative to the SMA wire 34. This allows the actuating unit 30 to fold around a corner of the movable part 20 in a compact manner. The angle between the coupling flexure 33 and the SMA wire 34 may be in the range from 70 to 110 degrees, preferably from 80 to 100 degrees. However, in general, the angle between coupling flexure 33 and SMA wire 34 may be outside these ranges.

Figure 3C:
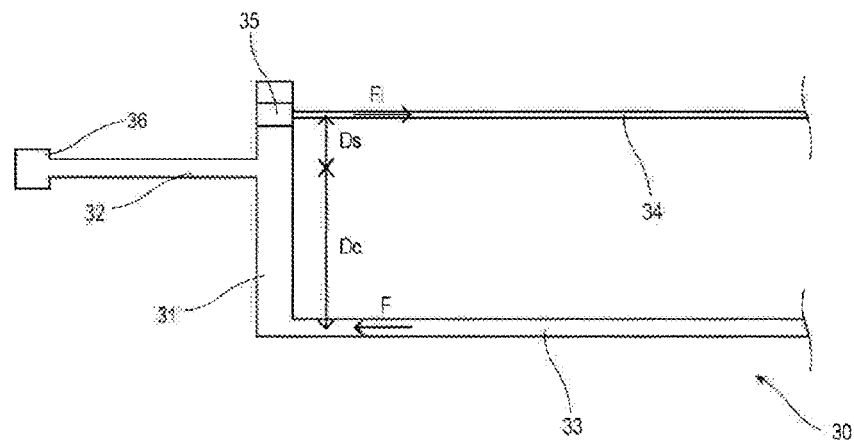

For instance, in the actuating unit 30 illustrated in FIG. 3C, the coupling flexure 33 is substantially perpendicular to the SMA wire 34.

In the above-described examples, the actuating unit 30 is arranged in a plane. In particular, the SMA wire 34, the coupling flexure 33 and the force-modifying flexure 32 are arranged so as to substantially extend in a common plane, at least when the actuator assembly 2 is in an initial configuration. This allows for a compact configuration of the actuating unit 30. The body portion 31, when embodied by a plate, may further be arranged to extend in the plane. However, in general, the components of the actuating unit 30 need not be arranged in a common plane. The SMA wire 34 and/or the coupling flexure 33 may be angled relative to the plane, for example.

In the above-described examples, the force-modifying flexure 32 is placed in tension on contraction of the SMA wire 34. This reduces the risk of buckling of the force-modifying flexure 32, reducing the risk of damage to the actuator assembly and making the actuator assembly 2 more reliable. However, the force-modifying flexure 32 could instead be arranged so as to be placed under compression on contraction of the SMA wire 34. With reference to FIG. 3B, for example, the force-modifying flexure 32 could extend to the bottom-right from the connection point between the body portion 31 and the force-modifying flexure 32, and so be placed under compression on contraction of the SMA wire 34. An arrangement in which the force-modifying flexure 32 is placed under compression is disclosed in WO 2022/084699 A1, which is herein incorporated by reference.

In the above-described examples, the force-modifying flexure 32 and the SMA wire 34 connect at one end to the support structure 10, and the coupling flexure 33 connects at one end to the movable part 20. In general, this arrangement may also be reversed, with the force-modifying flexure 32 and the SMA wire 34 connecting at one end to the movable part 20, and the coupling flexure 33 connecting at one end to the support structure 10.

In the above-described examples, the actuating unit 30 includes a coupling link 33 in the form of a coupling flexure 33. The purpose of the coupling link 33 is to allow movement of the movable part 20 in directions perpendicular to the actuating force F. In general, however, the actuating unit 33 need not include a coupling link 33, for example in examples in which there is no movement of the movable part 20 in directions perpendicular to the actuating force F. Furthermore, the coupling link 33 may be embodied by components other than the coupling flexure 33, for example by a ball bearing or plain bearing configured to transmit the actuating force F to the movable part 20 while allowing movement of the movable part 20 in directions perpendicular to the actuating force F. Such alternative examples of the coupling link 33 are disclosed in WO 2022/084699 A1.

Arrangement of Four Actuating Units

Figure 4:
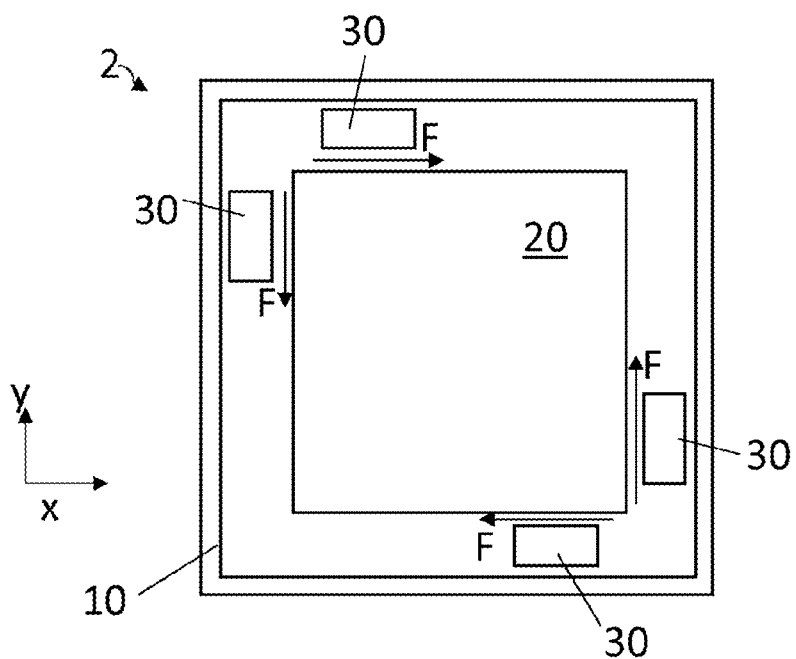
FIG. 4 is a schematic plan view of an arrangement of four actuating units.

FIG. 4 schematically shows a plan view of an example of the actuator assembly 2, showing an arrangement of actuating units 30. In this example, the actuator assembly 2 includes a total of four actuating units 30. The four actuating units 30 may apply actuating forces F between the movable part 20 and the support structure 10. The actuating forces F are applied to the movable part 20 relative to the support structure 10.

The arrangement of actuating units 30 of FIG. 4 may be used, for example, in examples in which the movable part 20 is movable relative to the support structure 10 in a movement plane. So, Tx, Ty and optionally Rz movement of the movable part 20 may be allowed.

The four actuating units 30 of FIG. 4 are in an arrangement capable of applying actuating forces F so as to move the movable part 20 relative to the support structure 10 to any positions within a range of movement. The range of movement may be within a movement plane that is perpendicular to the primary axis P.

In particular, two actuating units 30 (e.g. the top and bottom actuating units in FIG. 4) are arranged to apply actuating forces F in opposite directions parallel to a first axis (e.g. the x axis in FIG. 4). The other two of actuating units (e.g. the left and right actuating units in FIG. 4) are arranged to apply actuating forces F in opposite directions parallel to a second axis (e.g. the y axis in FIG. 4), perpendicular to the first axis. By appropriately varying the difference in actuation amount between the opposing actuating units 30, the movable part 20 may thus be moved independently along the first and second axes. The opposing actuating forces F are not colinear, but offset from each other in a direction perpendicular to the actuating forces. Providing opposing actuating units 30 allows the tension in the SMA wires 30 of the respective actuating units 30 to be controlled, allowing for more accurate and reliable positioning of the movable part 20 compared to a situation in which actuating units 30 do not oppose each other.

In examples, none of the actuating forces F are collinear. This allows the arrangement of actuating units 30 to translationally move the movable part 20 without applying any net torque to the movable part 20. So, the movable part 20 can be moved translationally in the movement plane without rotating the movable part 20 in the movement plane. In general, the arrangement of actuating units 30 is capable of accurately controlling a torque or moment of the movable part 20 about the primary axis P. So, the actuating units 30 are capable of rotating (or not rotating) the movable part 20 relative to the support structure about the primary axis P.

In particular, two actuating units 30 (e.g. the top and bottom actuating units in FIG. 4) are arranged to apply actuating forces F so as to generate a torque or moment between the movable part 20 and the support structure 2 in a first sense (e.g. clockwise) around the primary axis P. The other two actuating units 30 (e.g. the left and right actuating units 30 in FIG. 4) are arranged to apply actuating forces F so as to generate a torque or moment between the movable part 20 and the support structure 2 in a second, opposite sense (e.g. anti-clockwise) around the primary axis P. This allows the movable part 20 to be rotated by simultaneously increasing or decreasing the tension of SMA wires in any of the two actuating units 30.

As shown, two actuating units 30 may be arranged to apply actuating forces in a corner of the actuator assembly 2. The other two actuating units 30 may be arranged to apply actuating forces in another, opposite corner of the actuator assembly 2. The actuator assembly 2, and in particular the movable part 20 and/or the support structure 10, may have a square or rectangular footprint. Each actuating unit 30 may be provided on one of the four sides of the actuator assembly 2. In particular, each actuating unit 30 may bend around a corner of the movable part 20 such that the SMA wire 34 and the coupling flexure 33 of each actuating unit 30 extend along adjacent edges of the movable part 20. So, the actuating unit 30 may be as configured in FIGS. 3A and 3B, for example. The four SMA wires 32 of the four actuating units 32 may extend along the four different edges of the movable part 20.

The arrangement of actuating forces F applied between movable part 20 and support structure 10 corresponds to the arrangement of SMA wires 30 described in WO2013/175197 A1, which is herein incorporated by reference.

In this example, the actuating forces F are perpendicular to the primary axis P, and may be parallel to the movement plane. However, in general the actuating forces F may be angled relative to the movement plane. The actuating forces F may thus have a component along the primary axis P. This component along the primary axis P may be resisted by the bearing arrangement 40, for example, to provide movement of the movable part 20 in degrees of freedom allowed by the bearing arrangement 40. In some examples, it may even be desirable for actuating forces F to have a component in parallel to the primary axis P, for example so as to load plain or rolling bearings arranged between the movable part 20 and the support structure 10.

Although, for illustrative purposes, the arrangement of actuating units 30 was described as moving the movable part 20 in the movement plane (e.g. translationally along the x and y axis, or rotationally about the primary axis P), in other examples the movable part 20 may be moved differently. For example, the same arrangement of actuating forces F may be used to tilt the movable part 20 relative to the support structure 10 about axes perpendicular to the primary axis, due to appropriate movement constraints provided by the bearing arrangement 40. For example, the bearing arrangement 40 may include a plurality of flexures for guiding tilting of the movable part 20 about the axes perpendicular to the primary axis P. Examples of such bearing arrangement 40 are described in WO2022/029441 A1, which is herein incorporated by reference.

Although the actuator assembly 2 is described herein in the context of four actuating units 30, in general the actuator assembly 2 may include fewer actuating units 30. For example, the actuator assembly 2 may include two actuating units 30, e.g. the two actuating units 30 depicted in the top left of FIG. 4. The forces applied to the movable part 20 by the two actuating units 30 may be opposed by a biasing force of one or more resilient elements, such as springs. With reference to FIG. 4, the two actuating units 30 in the bottom right corner may be replaced with springs applying biasing forces along the corresponding depicted arrows, for example.

Arrangement of Eight Actuating Units

Figure 5:
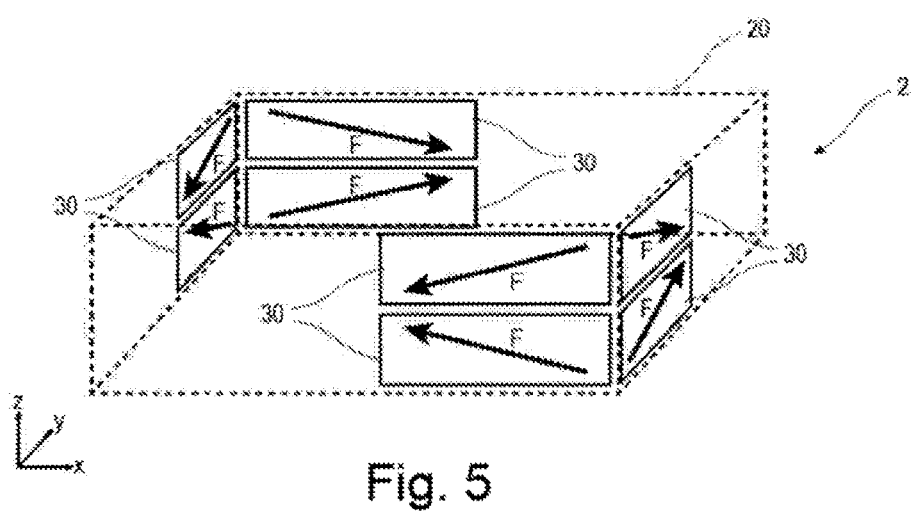
FIG. 5 is a schematic perspective view of an arrangement of eight actuating units.

FIG. 5 schematically shows a perspective view of an actuator assembly 2 with a total of eight actuating units 30. The eight actuating units 30 may apply actuating forces F between the movable part 20 and the support structure 10. The actuating forces F are applied to the movable part 20 relative to the support structure 10.

The arrangement of actuating units 30 of FIGS. 5A and 5B may be used, for example, in examples in which the movable part 20 is movable relative to the support structure 10 in three translational degrees of freedom (Tx, Ty, Tz) (see FIG. 1E) or in two or three rotational degrees of freedom (Rx, Ry or Rx, Ry, Rz) (see FIG. 1C).

The eight actuating units 30 may be arranged such that the actuating forces F of the eight actuating units 30 are oriented or arranged in a manner equivalent to the orientation or arrangement of the forces applied by the eight SMA wires in the actuator assemblies disclosed in WO 2011/104518 A1.

More specifically, the actuating forces F (e.g. when visualised as vectors at particular positions in space) are arranged on each of four sides (i.e. a first side, a second side, a third side and then a fourth side) around the primary axis P. The two actuating forces F on each side are inclined in opposite senses with respect to each other, as viewed perpendicular from the primary axis. The four sides on which the actuating forces F are arranged extend in a loop around the primary axis. In this example, the sides are perpendicular and so form a square as viewed along the primary axis, but alternatively the sides could take a different e.g. quadrilateral shape. In this example, the actuating forces F are parallel to the outer faces of the square envelope of the moveable part 6 but this is not essential.

Four actuating forces F, including one force on each of the sides, form a 'first' group that have a component in one direction ('upwards' or +z) and the other four actuating forces F form a 'second' group that have a component in the opposite direction ('downwards' or −z). Herein, 'up' and 'down' refer to opposite directions along the primary axis P.

The actuating forces F have a symmetrical arrangement in which their magnitudes and inclination angles are the same, so that both the first group of actuating forces F and the second group of actuating forces F are each arranged with two-fold rotational symmetry about the primary axis.

As a result of this symmetrical arrangement, different combinations of the actuating forces F are capable of driving movement of the moveable part 6 with multiple degrees of freedom, as follows.

The first group of actuating forces F, when generated together, drive upwards (+z) movement, and the second group of actuating forces F, when generated equally, drive downwards (−z) movement.

Within each group, adjacent pairs of actuating forces F, when differentially generated, drive tilting about a lateral axis perpendicular to the primary axis z (Rx or Ry). Tilting in any arbitrary direction may be achieved as a linear combination of tilts about the two lateral axes.

Sets of four actuating forces F, including two actuating forces F from each group, when generated together, drive movement along a lateral axis perpendicular to the primary axis P (Tx or Ty). Movement in any arbitrary direction perpendicular to the primary axis z may be achieved as a linear combination of movements along the two lateral axes.

The SMA actuator may have other specific arrangements of actuating units 30 to those shown in FIG. 5. For example, strict symmetry is not required. Furthermore, instead there being an up-pulling actuating unit 30 and a down-pulling actuating unit 30 on each side, there maybe two up-pulling actuating units 30 on each of two opposite sides (e.g. the first and third sides) and two down-pulling actuating units 30 on the other two sides (e.g. the second and fourth sides).

Movement of Actuating Units Along the Primary Axis

Figure 6A:
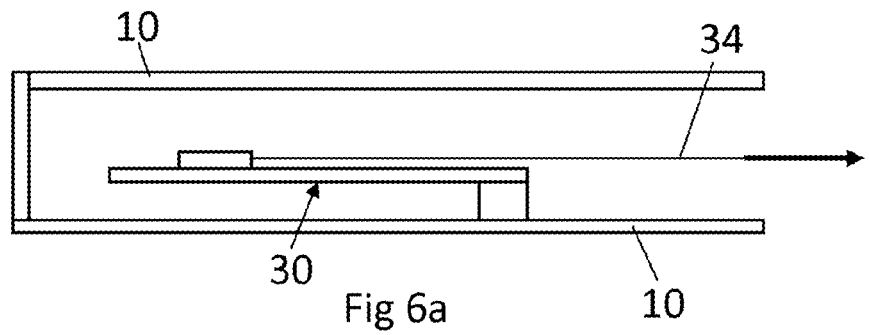
FIGS. 6a and 6b are examples of an actuator assembly with an actuating unit in a central position and in two possible non-central positions.
Figure 6B:
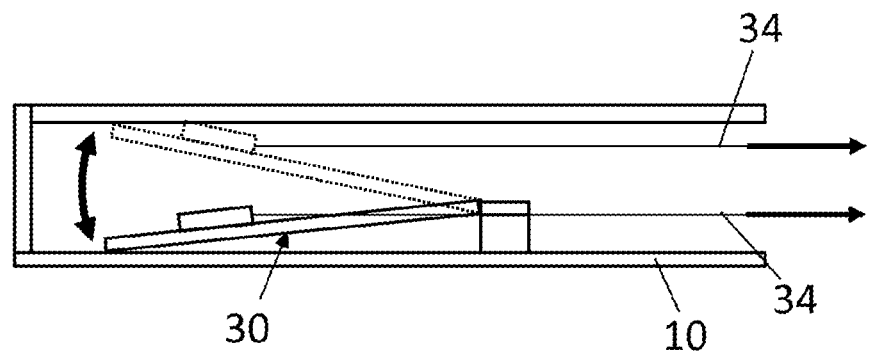

Referring in particular to FIGS. 6a and 6b, the issue of movement of actuating units along the primary axis will now be explained with reference to a comparative example of an actuator assembly without any bearing arrangement 50.

When an actuating unit 30 is subject to a relatively low force, as illustrated in FIG. 4a, the actuating unit 30 (including the body portion 31, the force-modifying flexure 32, and the coupling link 33) extends parallel to the actuating plane. The size of the gap between the actuating unit 30 and the support structure 10 and/or movable part 20 may be substantially constant.

However, when an actuating unit 30 is subject to a relatively large force, the actuating unit 30 may be susceptible to bending out of the actuating plane so that at least part of it is displaced along the primary axis P. This is schematically illustrated in FIG. 4b. Such relatively large forces may be, for example, due to the tension in the SMA wire 34 of the actuating unit 30 and/or due to the other actuating units 30. As will be appreciated, this may be due to unstable or unbalanced input and output forces on the body portion 31. Furthermore, impulses acting on the actuator assembly 2, for example due to drops or other impacts, may result in deformation of the actuating unit 30 out of the actuating plane. Deformation out of the actuating plane may be only by a small amount or may continue until part of the actuating unit 30 contacts the support structure 10 and/or movable part 20. In any case, the accuracy of actuation of the actuating unit may be reduced, and/or the actuating unit 30 is at risk of damage due to such undesirable deformation. So, the performance and/or reliability of the actuator assembly 2 may be adversely affected.

Bearing Arrangement on Actuating Unit

The inventors have identified this issue of possible undesirable out-of-plane deformation of the actuating unit 30. According to the present invention, a bearing arrangement 50 to the actuating unit 30 is provided. The bearing arrangement 50 may reduce or prevent deformation of the actuating unit 30 out of the actuating plane. The bearing arrangement 50 may improve the reliability and/or performance of the actuating unit 30.

In general, the bearing arrangement 50 guides movement of the actuating unit 30, for example movement of the body portion 31 of the actuating unit 30, in the actuating plane. The bearing arrangement 50 may constrain (i.e. restrict or prevent) movement of the actuating unit 30 (in particular of the body portion 31) out of the actuating plane.

FIGS. 5a-c show embodiments of actuator assemblies 2 in which a bearing arrangement 50 is provided to guide movement of the actuating unit 30, specifically of the body portion 31. Only the body portion 31, force-modifying element 32 and SMA element 34 are shown in FIGS. 7a-c for illustrative purposes, but the actuating units 30 may in general be as described with reference to FIGS. 3a and 3b and comprise a coupling link 33. Similarly, the support structure 10 is shown while the movable part 20 is not shown in FIGS. 7a-c for illustrative reasons, but it will be appreciated that the movable part 20 may form part of the actuator assemblies 2 of FIGS. 7a-c.

FIG. 7a schematically depicts an embodiment of the bearing arrangement 50 in the form of a plain bearing. The plain bearing may also be referred to as a sliding bearing. The plain bearing comprises a first bearing surface 51 and a second bearing surface 52. The first bearing surface 51 forms part of the actuating unit 30. The first bearing surface 51 is a surface of the actuating unit 30 and/or is fixed relative to the actuating unit 30. The first bearing surface 51 is on the body portion 31 of the actuating unit 30, for example. The first bearing surface 51 may be formed integrally with the actuating unit 30 (e.g. integrally with the body portion 31) or may be formed on a component that is fixed relative to the actuating unit 30 (e.g. fixed to the body portion 31).

The second bearing surface 52 is on the support structure 10 (as shown in FIG. 5a) or on the movable part 20. The second bearing surface 52 is a surface of the support structure 10 or a surface of the movable part 20.

The first and second bearing surfaces 51, 52 are arranged to bear against each other on actuation of the actuating unit 30. So, the first and second bearing surfaces 51, 52 are arranged to remain in contact and to slide relative to each other on actuation of the actuating unit 30. The first and second bearing surfaces 51, 52 may be parallel to the actuating plane.

The first and second bearing surfaces 51, 52 may be low-friction surfaces. Optionally, a friction-reducing coating may be provided on the first and second bearing surfaces 51, 52. Additionally or alternatively, a fluid (not shown) may be disposed between the bearing surfaces 51, 52. The material properties of the fluid (if provided) may be selected to provide lubrication between the bearing surfaces 51, 52 so that the coefficient of friction between the bearing surfaces 51, 52 is reduced. For example, the fluid may be a grease or other lubricant.

FIG. 5b schematically depicts another embodiment of the bearing arrangement 50 in the form of a rolling bearing 50, such as a roller bearing or a ball bearing. The rolling bearing 50 comprises a first bearing surface 51 a second bearing surface 52. The first bearing surface 51 is formed on (i.e. formed integrally with or fixed relative to) the actuating unit 30, preferably on the body portion 31 of the actuating unit. The second bearing surface 52 is formed on (i.e. formed integrally with or fixed relative to) the support structure 10 or on the movable part 20.

The rolling bearing 50 further comprises a rolling element 55 arranged between the first and second bearing surfaces 51, 52. The rolling element 55 may be a ball (in case of a ball bearing 50) or a roller (in case of a roller bearing 50). The rolling element 55 is arranged to roll relative to the first and second bearing surfaces 51, 52 on actuation of the actuating unit 30. The use of a rolling bearing reduces friction in the beating arrangement 50 compared to a plain bearing and may reduce or avoid slip stick friction behaviour.

The rolling element 55 may be partially contained by a recess formed in one or both of the first and second bearing surfaces 51, 52. With reference to FIG. 5b, the second bearing surface 52 is shown as being arranged in such a recess. The recess may help retain the bearing element 55 in place, for example in the event that impulses act on the actuator assembly 2. The recess may be formed by a separate component attached to the support structure 10, movable part 20 and/or actuating unit 30. Alternatively, the recess may be integrally formed with the support structure 10, movable part 20 and/or actuating unit 30. The recess may be formed by a partial etch in the body portion 31 of the actuating unit 30, for example.

FIG. 5c schematically depicts another embodiment of the bearing arrangement 50 in the form of a rolling bearing 50. The rolling bearing 50 may in essence be configured as described with reference to the embodiment of FIG. 5b, except that the bearing element 55 is not provided in a recess in the embodiment of FIG. 5c. Compared to the ball bearing 50 of FIG. 5b, which is arranged on the top side of the actuator assembly 2, the ball bearing 50 in FIG. 5c is arranged between the body portion 31 and a bottom side of the actuator assembly 2.

Although the bearing arrangement 50 has been described as a plain bearing or a rolling bearing, in general the bearing arrangement 50 may comprise other types of bearing for guiding movement of the actuating unit 30 relative to the support structure 10 and/or movable part 20 in the actuating plane. For example, the bearing arrangement 50 may comprise a flexure bearing. The flexure bearing comprises one or more flexures that are arranged so as to guide movement of the actuating unit 30 in the actuating plane. In particular, the flexures may be arranged perpendicularly to the actuating plane (i.e. in the vertical direction in FIGS. 5a-5c). With reference to FIG. 5c, for example, instead of the bearing element 55, one or more elongate flexures may extend from the top of the support structure 10 to the actuating unit 30. The flexures may be elongate and have a length that is substantially perpendicular to the actuating plane.

Loading Force for Bearing Arrangement

As shown in FIG. 5a-c, a loading force or biasing force Fb may load the bearing arrangement 50. The loading force Fb urges the bearing surfaces 51, 52 towards each other. The loading force Fb may load the bearing arrangement 50 such that the bearing surfaces 51, 52 remains engaged throughout an operating range of the actuating unit 30.

The loading force Fb may be provided by (or contributed to by) the SMA element 34. In particular, in FIGS. 5a and 5b, the SMA element 34 is parallel to but offset from the actuating plane, so as to induce a moment urging the actuating unit 30, and in particular the body portion 31 thereof, upwards. So, on contraction of the SMA wire 34, the SMA wire 34 urges the bearing surfaces 51, 52 towards each other, thereby loading the bearing arrangement 50. In FIG. 5c, the SMA element 34 is inclined relative to the actuating plane. The input force applied by the SMA element 34 is inclined relative to the actuating plane, so as to comprise a component (in the vertical direction in FIG. 7c) for loading the bearing arrangement 50 as well as a component (in the horizontal direction in FIG. 7c) for actuating the actuating unit 30.

So, the biasing force or loading force Fb may be generated by the SMA wire 32 when the SMA wire 32 is in tension. To provide for this, the SMA wire 34 may extend at a non-zero angle to the movement plane (e.g. be angled 'upwards' away from the crimp 35). Alternatively or additionally, the force-modifying flexure 32 may extend at a non-zero angle to the movement plane (e.g. be angled 'downwards' between the crimp 35 and the foot portion 36).

Alternatively or additionally, the force-modifying element 32 (in particular in the form of a force-modifying flexure 32) or the coupling link 33 (in particular in the form of a coupling flexure 33) may provide or contribute to the loading force Fb. The loading force Fb may be applied by the flexure connected to the part that comprises the second bearing surface 32. With reference to FIG. 7c, for example, the force-modifying flexure 32 is connected to the support structure 10 and the second bearing surface 52 is provided on the support structure 10. So, the force-modifying flexure 32 may be configured to provide the loading force. Alternatively, in embodiments in which the bearing arrangement 50 is between the actuating unit 30 and the movable part 20, and the coupling flexure 33 connects to the movable part 20, the coupling flexure 33 may provide the loading force Fb.

Figure 8A:
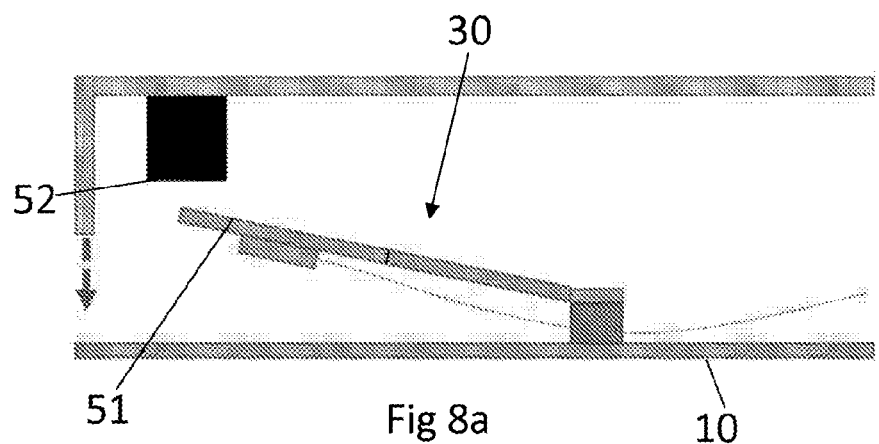
FIGS. 8a-c are schematic side views illustrating how a loading force may be applied.
Figure 8B:
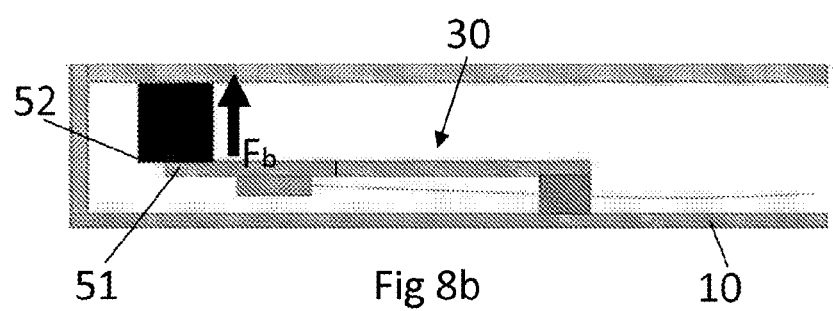

The loading force Fb may be provided by pre-loading the force-modifying flexure 32 and/or the coupling flexure 33. This is schematically shown in FIGS. 8a and 8b. In particular, as shown in FIG. 8a, the force-modifying flexure 8a may (in an unloaded state) curve upwards. During assembly of the actuator assembly 2, the force-modifying flexure may be deformed so as to be pre-loaded or sprung against the bearing arrangement 50. So, the loading force Fb may be generated by way of a pre-stress in the force-modifying flexure 32 (e.g. by ensuring that the force-modifying flexure 32 is elastically deformed during assembly of that actuator assembly 2).

Figure 8C:
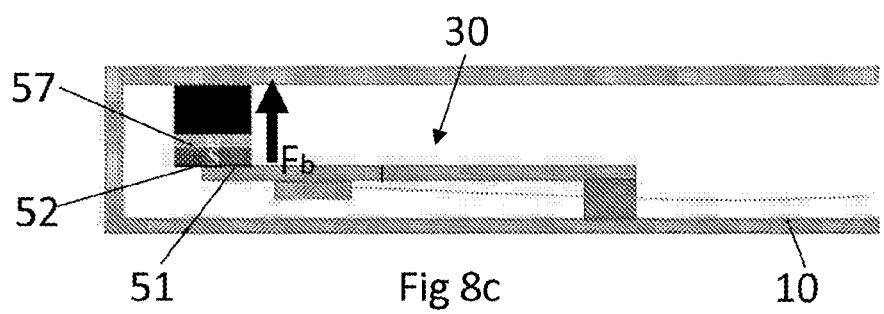

Alternatively or additionally, a separate loading arrangement 57 (i.e. one separate from the SMA element 34, force-modifying flexure 32 and coupling flexure 33) may provide or contribute to the loading force Fb. The loading arrangement 57 may, for example, comprise a magnetic loading arrangement, as shown in FIG. 8c. So, a separate biasing arrangement (e.g. a magnetic biasing arrangement) could also be used. The actuating unit 30 may be ferromagnetic such that the magnet magnetically attracts the actuating unit 30 so as to load the bearing arrangement 50. The loading arrangement 57 may alternatively comprise dedicated springs, such as coil springs or other flexures, to load the bearing arrangement 50.

Some embodiments may not require provision of the loading force Fb. For example, with reference to FIG. 5c, bearing elements 55 may be provided on two opposing sides of the body portion 31 so as to sandwich the body portion between two bearing elements 55. The two bearing elements 55 may basically load each other. Similarly, with reference to FIG. 5a, the body portion 31 may be sandwiched between two bearing surfaces arranged on the support structure 10. Furthermore, a loading force Fb may not be required in embodiments in which the bearing arrangement 50 comprises a flexure bearing. Alternatively, if the bearing arrangement 50 comprises a flexure bearing, a loading force Fb may be provided so as to put the flexures of the flexure bearing in tension.

Friction Surfaces for Zero Hold Power

FIGS. 9*a* to 9*d* show further actuator assemblies 2 incorporating friction surfaces 61, 62 for holding the actuating units 30 in place when the SMA element 34 is not powered. In particular, a first friction surface 61 may be provided on the actuating unit 30 (in particular on the body portion 31). A second friction surface 62 may be provided on the support structure 10 and/or the movable part 20. The second friction surface 62 may be provided on the same part as the SMA element 34.

The first and second friction surfaces 61, 62 may be biased against each other with a normal force Fn. The normal force Fn generates a static frictional force Fs between the friction surfaces 61, 62 that constrains movement of the actuating unit 30 (in particular of the body portion 31) relative to the support structure 10 or movable part 20 when the SMA element 34 of the actuating unit 30, or the SMA element 34 of another actuating unit 30 forming part of the actuator assembly 2, is not actuated (i.e. is held slack or in a non-tensioned state). So, the actuating units 30, and optionally the movable part 20 held by the actuating units 30, may be held in position when the SMA wires 34 are no powered, i.e. when the SMA wires 34 are held slack. The static frictional force Fs may be generated at any position of the body portion 31 along its movement path relative to the support structure 10 or movable part 20. As such, the body portion 31 of each actuating unit 30, and thus the movable part 20 held by the combination of actuating units 30, may be held at any position within an operating range or movement envelope.

The frictional force Ff may be large enough to constrain movement of the body portion 31 of the respective actuating unit 30. Furthermore, in some embodiments, the sum of the frictional forces Ff generated in the actuating units 30 of the actuator assembly 2 may be large enough to constrain movement of the movable part 20. So, the ratio of the sum of static frictional forces Ff to weight (at earth's average gravitational acceleration of 9.81 m/s$^2$) of the movable part 20 may be greater than 1. This ensures that movement of the movable part is constrained by the frictional force even when the actuator assembly 1 is turned on its side, for example. Preferably, the ratio of the sum of static frictional forces to the weight of the movable part 20 is greater than 3, further preferably greater than 5, further preferably greater than 10.

So, the present invention provides means for retaining the actuating unit 30 at the desired position when the SMA elements 34 are not energised, thereby eliminating the need for continuously energising the SMA elements 34. Power consumption may thus be reduced. Furthermore, the risk of damage to the actuator assembly due to moving parts during impact events may be reduced.

Figure 9A:
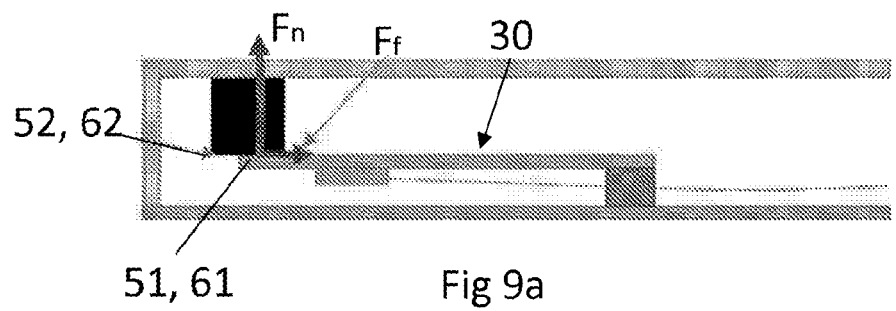
FIGS. 9a-d are schematic side views of actuator assemblies comprising friction surfaces for holding the actuating unit in place.
Figure 9B:
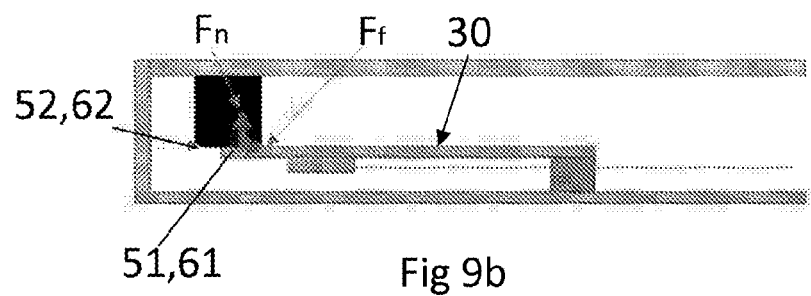

FIGS. 9*a* and 9*b* show one embodiment of the actuator assembly 2 comprising the friction surfaces 61, 62. In this embodiment, the friction surfaces 61, 62 also act as bearing surfaces 51, 52 of a plain bearing 50. The plain bearing 50 may be as described with reference to FIG. 7*a*, for example. So, the bearing arrangement 50 may comprise the friction surfaces 61, 62. The loading force Fb may correspond in essence to the normal force Fn. The normal force Fn may be provided by the force-modifying flexure 32 or coupling flexure 33, or by a dedicated loading arrangement, as described in relation to FIGS. 8*a-c*.

In the embodiment of FIGS. 9*a-d*, the SMA element 34 is arranged, on actuation, to reduce the normal force Fn, thereby reducing the frictional force Ff between the first and second friction surfaces 61, 62. The normal force Fn may be reduced by at least 10%, preferably at least 20%, most preferably by at least 50%. The normal force Fn may be reduced by at least 90%. In some embodiments, the normal force N is reduced by 100%, i.e. the first and second friction surfaces 61, 62 separate on actuation of the SMA element 34.

The SMA element 34 may be inclined relative to the actuating plane (not shown in FIGS. 9*a,b*), as explained in relation to FIG. 7*c*, for example. So, the input force Fi may be inclined relative to the actuating plane. The input force Fi may have a component (in the vertical direction in FIG. 9*a*) reducing the normal force Fn and a component (in the horizontal direction in FIG. 9*b*) for moving the body portion 31 in the actuating plane. Alternatively, as in the arrangement shown in FIGS. 9*a,b*, the SMA element 34 may be offset from the actuating plane (i.e. from the plane intersecting the centre of the body portion 31 and force-modifying flexure 32), thereby inducing a force couple that reduces the normal force Fn.

Figure 9C:
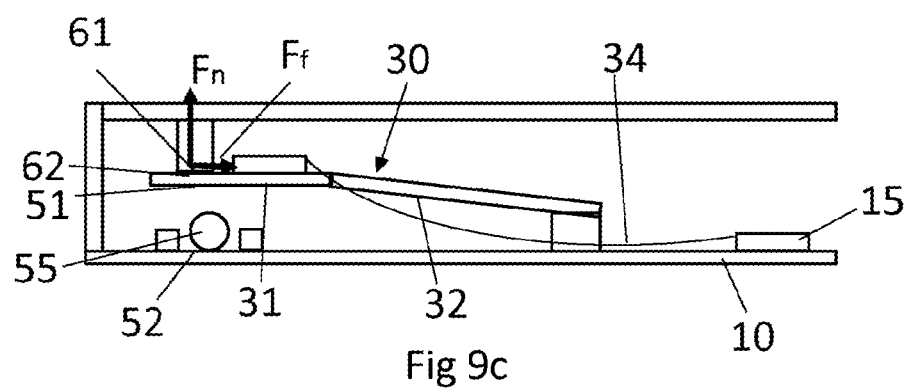
Figure 9D:
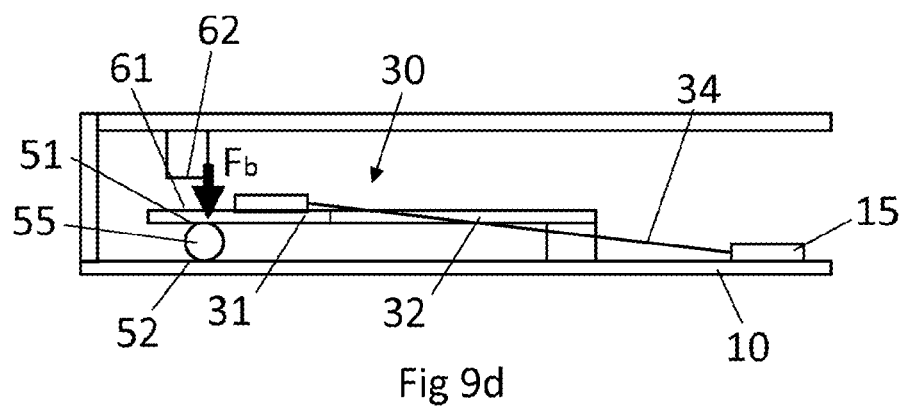

FIGS. 9*c* and 9*d* show another embodiment of the actuator assembly 2 with frictional surfaces 61, 62. Here, the frictional surfaces 61, 62 are formed separately from the bearing arrangement 50.

As shown in FIG. 9*c*, when the SMA element 34 is held slack (i.e. not actuated), the first and second frictional surfaces 61, 62 may be biased against each other by a normal force Fn. The normal force Fn gives rise to the frictional forces Ff, holding the body portion 31 of the actuating unit 30 in position.

Upon initial actuation of the SMA element, the normal force Fn is reduced until the first and second friction surfaces 61, 62 separate. The body portion 31 is moved in a direction orthogonal to the actuating plane until the bearing arrangement 50 is engaged, as shown in FIG. 9*d*. The SMA element 34 thus provides the loading force Fb for loading the bearing arrangement 50. Once the bearing arrangement 50 is loaded, the SMA element 34 applies the input force Fi to the body portion 31 so as to actuate the actuation unit 30 in the manner described in relation to FIGS. 3*a* and 3*b*.

In FIGS. 9*c* and 9*d*, the bearing arrangement 50 is shown as a rolling bearing 50. However, in general, any of the other bearing arrangements 50 described herein may alternatively be used. For example, a plain bearing with bearing surfaces having lower coefficients of friction than the friction surfaces may be used in some instances. Alternatively, a bearing arrangement 50 need not be provided in the embodiment of FIGS. 9*c* and 9*d*, and the friction surfaces 61, 62 may disengage without the body portion 31 subsequently being lifted onto a bearing arrangement 50.

Furthermore, although the embodiment of FIGS. 9*c* and 9*d* has been described in relation to separating the first and second friction surfaces 61, 62, in general the friction surfaces 61, 62 may remain engaged. The normal force Fn may be reduced and the loading force Fb may be increased on SMA element 34 actuation.

Although the SMA element 34 has been described as reducing the normal force Fn with reference to FIGS. 9*a-d*, this is not in general required. The normal force Fn may remain constant or even increase slightly on SMA element actuation. The input force Fi may be sufficiently large to overcome the frictional forces Ff so as to actuate the actuating unit 30.

SMA Element

The above-described SMA actuator assemblies comprise at least one SMA element. The term 'shape memory alloy (SMA) element' may refer to any element comprising SMA. The SMA element may be described as an SMA wire. The SMA element may have any shape that is suitable for the purposes described herein. The SMA element may be elongate and may have a round cross section or any other shape cross section. The cross section may vary along the length of the SMA element. The SMA element might have a relatively complex shape such as a helical spring. It is also possible that the length of the SMA element (however defined) may be similar to one or more of its other dimensions. The SMA element may be sheet-like, and such a sheet may be planar or non-planar. The SMA element may be pliant or, in other words, flexible. In some examples, when connected in a straight line between two components, the SMA element can apply only a tensile force which urges the two components together. In other examples, the SMA element may be bent around a component and can apply a force to the component as the SMA element tends to straighten under tension. The SMA element may be beam-like or rigid and may be able to apply different (e.g. non-tensile) forces to elements. The SMA element may or may not include material(s) and/or component(s) that are not SMA. For example, the SMA element may comprise a core of SMA and a coating of non-SMA material. Unless the context requires otherwise, the term 'SMA element' may refer to any configuration of SMA material acting as a single actuating element which, for example, can be individually controlled to produce a force on an element. For example, the SMA element may comprise two or more portions of SMA material that are arranged mechanically in parallel and/or in series. In some arrangements, the SMA element may be part of a larger SMA element. Such a larger SMA element might comprise two or more parts that are individually controllable, thereby forming two or more SMA elements. The SMA element may comprise an SMA wire, SMA foil, SMA film or any other configuration of SMA material. The SMA element may be manufactured using any suitable method, for example by a method involving drawing, rolling, deposition and/or other forming process(es). The SMA element may exhibit any shape memory effect, e.g. a thermal shape memory effect or a magnetic shape memory effect, and may be controlled in any suitable way, e.g. by Joule heating, another heating technique or by applying a magnetic field.

The invention claimed is:

1. An actuator assembly comprising:
 a first part;
 a second part that is movable relative to the first part; and
 one or more actuating units each configured to apply an actuating force to the second part capable of moving the second part relative to the first part,
 wherein each actuating unit comprises:
  a body portion;
  a bearing arrangement between the body portion and the first or second part and arranged to guide movement of the body portion relative to the first or second part in an actuating plane;
  an SMA element connected between the body portion and the first part, and arranged, on actuation, to apply an input force to the body portion; and
  a force-modifying element connected between the body portion and the first part and configured to modify the input force so as to give rise to the actuating force.

2. An actuator assembly according to claim 1, wherein the bearing arrangement comprises:
 a rolling bearing, the rolling bearing comprising a first bearing surface on the body portion, a second bearing surface on the first or second part, and a rolling element arranged between the first and second bearing surfaces, wherein the rolling element is arranged to roll relative to the first and second bearing surfaces on actuation of the actuating unit; or
 a plain bearing, the plain bearing comprising a first bearing surface on the body portion and a second bearing surface on the first or second part, wherein the first and second bearing surfaces are arranged to bear against each other on actuation of the actuating unit.

3. An actuator assembly according to claim 1, wherein the force-modifying element and/or a coupling link is configured to load the bearing arrangement and/or the SMA element is arranged, on actuation, to load the bearing arrangement.

4. An actuator assembly according to claim 1, wherein each actuating unit comprises a first friction surface biased to engage a corresponding second friction surface on the first or second part so as to generate a static frictional force that constrains movement of the body portion of the actuating unit relative to the second friction surface when the SMA element is not actuated.

5. An actuator assembly according to claim 4, wherein the first and second friction surfaces form part of the bearing arrangement or are separate to the bearing arrangement.

6. An actuator assembly according to claim 4, wherein the force-modifying element and/or a coupling element is arranged to bias the first and second friction surfaces against each other.

7. An actuator assembly according to claim 4, wherein the SMA element is arranged, on actuation, to reduce the frictional force between the first and second friction surfaces or to disengage the first and second friction surfaces.

8. An actuator assembly according to claim 1, wherein the SMA element is arranged, on initial actuation, to move the body portion in a direction orthogonal to the actuating plane so as to engage the bearing arrangement and is arranged, on further actuation, to apply an input force to the body portion capable of moving the body portion in the actuating plane.

9. An actuator assembly according to claim 1, wherein the force-modifying element comprises a force-modifying flexure.

10. An actuator assembly according to claim 1, wherein each actuating unit is configured so as to amplify an amount of actuation of the SMA element to a relatively greater amount of movement of the second part relative to the first part, optionally by a factor greater than 1.5, preferably greater than 2, further preferably greater than 3.

11. An actuator assembly according to claim 1, wherein each actuating unit further comprises a coupling link connected between the body portion and the second part, wherein the coupling link is configured to transmit the actuating force from the body portion to the second part, and wherein the coupling link is compliant in a direction perpendicular to the direction of the actuating force.

12. An actuator assembly according to claim 11, wherein the coupling link comprises a coupling flexure and the coupling link is arranged to be in tension on actuation of the SMA element.

13. An actuator assembly according to claim 1, wherein each actuating unit extends substantially in the actuating plane.

14. An actuator assembly according to claim 1, comprising a total of four actuating units arranged to apply actuating forces such that none of the actuating forces are non-collinear.

15. An actuator assembly according to claim 1, comprising an image sensor and/or a lens assembly, wherein the image sensor or the lens assembly is fixed relative to the second part and/or the lens assembly or the image sensor is fixed relative to the first part.

16. An actuator assembly comprising:
a first part;
a second part that is movable relative to the first part; and
one or more actuating units each configured to apply an actuating force to the second part capable of moving the second part relative to the first part,
wherein each actuating unit comprises:
  a body portion;
  an SMA element connected between the body portion and the first part, and arranged, on actuation, to apply an input force to the body portion; and
  a force-modifying element connected between the body portion and the first part and configured to modify the input force so as to give rise to the actuating force,
wherein the actuating unit comprises a first friction surface biased to engage a corresponding second friction surface on the first or second part so as to generate a static frictional force that constrains movement of the body portion of the actuating unit relative to the second friction surface when the SMA element is not actuated.

17. An actuator assembly according to claim 16, wherein each actuating unit further comprises a bearing arrangement between the body portion and the first or second part and arranged to guide movement of the body portion relative to the first or second part in an actuating plane.

18. An actuator assembly according to claim 17, wherein the first and second friction surfaces form part of the bearing arrangement or are separate to the bearing arrangement.

19. An actuator assembly according to claim 16, wherein the force modifying element and/or the coupling element is arranged to bias the first and second friction surfaces against each other.

20. An actuator assembly according to claim 16, wherein the SMA element is arranged, on actuation, to reduce the frictional force between the first and second friction surfaces or to disengage the first and second friction surfaces.

* * * * *